United States Patent
Kroon et al.

(10) Patent No.: US 8,077,332 B2
(45) Date of Patent: Dec. 13, 2011

(54) BIT-MAP DECOMPRESSION

(75) Inventors: Stephen M. Kroon, Sherwood, OR (US); Paul W. Philippi, Sherwood, OR (US)

(73) Assignee: Xerox Corporation, Norwalk, CT (US)

(*) Notice: Subject to any disclaimer, the term of this patent is extended or adjusted under 35 U.S.C. 154(b) by 3040 days.

(21) Appl. No.: 10/274,470

(22) Filed: Oct. 17, 2002

(65) Prior Publication Data

US 2004/0075706 A1    Apr. 22, 2004

(51) Int. Cl.
*G06F 3/12* (2006.01)
*G06K 15/00* (2006.01)
(52) U.S. Cl. .................. 358/1.15; 358/534; 358/3.06
(58) Field of Classification Search .......... 358/1.9, 358/1.14, 3.1, 448, 453, 3.06–3.09, 539, 358/1.15, 534–536, 3.11–3.12; 382/239; 347/15

See application file for complete search history.

(56) References Cited

U.S. PATENT DOCUMENTS

| | | | |
|---|---|---|---|
| 4,760,460 A | 7/1988 | Shimotohno | 358/261 |
| 5,216,753 A * | 6/1993 | Ng | 358/1.9 |
| 5,359,430 A | 10/1994 | Zhang | 358/455 |
| 5,444,551 A * | 8/1995 | Miller et al. | 358/3.14 |
| 5,777,757 A * | 7/1998 | Karlsson et al. | 358/3.1 |
| 5,917,952 A | 6/1999 | Noh | 382/239 |

FOREIGN PATENT DOCUMENTS

EP    0 683599 A1    11/1995

* cited by examiner

*Primary Examiner* — Dov Popovici
*Assistant Examiner* — Quang N Vo
(74) *Attorney, Agent, or Firm* — Manuel Quiogue (57) ABSTRACT

Writing a decompressed bit-map cell in accordance with a pixel count and a fill order pattern based on half-tone threshold values of a half-toned bit-map compression cell that was used to determine the pixel count.

6 Claims, 9 Drawing Sheets

FIG. 1

| 30 | 29 | 28 | 27 | 26 | 25 | 32 | 13 | 2 | 1 | 8 | 23 | 34 | 15 | 4 | 5 | 6 | 21 | 36 | 39 |
|---|---|---|---|---|---|---|---|---|---|---|---|---|---|---|---|---|---|---|---|
| 31 | 12 | 11 | 10 | 9 | 24 | 33 | 14 | 3 | 0 | 7 | 22 | 35 | 16 | 17 | 18 | 19 | 20 | 37 | 38 |
| 32 | 13 | 2 | 1 | 8 | 23 | 34 | 15 | 4 | 5 | 6 | 21 | 36 | 39 | 30 | 29 | 28 | 27 | 26 | 25 |
| 33 | 14 | 3 | 0 | 7 | 22 | 35 | 16 | 17 | 18 | 19 | 20 | 37 | 38 | 31 | 12 | 11 | 10 | 9 | 24 |
| 34 | 15 | 4 | 5 | 6 | 21 | 36 | 39 | 30 | 29 | 28 | 27 | 26 | 25 | 32 | 13 | 2 | 1 | 8 | 23 |
| 35 | 16 | 17 | 18 | 19 | 20 | 37 | 38 | 31 | 12 | 11 | 10 | 9 | 24 | 33 | 14 | 3 | 0 | 7 | 22 |
| 36 | 39 | 30 | 29 | 28 | 27 | 26 | 25 | 32 | 13 | 2 | 1 | 8 | 23 | 34 | 15 | 4 | 5 | 6 | 21 |
| 37 | 38 | 31 | 12 | 11 | 10 | 9 | 24 | 33 | 14 | 3 | 0 | 7 | 22 | 35 | 16 | 17 | 18 | 19 | 20 |
| 26 | 25 | 32 | 13 | 2 | 1 | 8 | 23 | 34 | 15 | 4 | 5 | 6 | 21 | 36 | 39 | 30 | 29 | 28 | 27 |
| 9 | 24 | 33 | 14 | 3 | 0 | 7 | 22 | 35 | 16 | 17 | 18 | 19 | 20 | 37 | 38 | 31 | 12 | 11 | 10 |
| 8 | 23 | 34 | 15 | 4 | 5 | 6 | 21 | 36 | 39 | 30 | 29 | 28 | 27 | 26 | 25 | 32 | 13 | 2 | 1 |
| 7 | 22 | 35 | 16 | 17 | 18 | 19 | 20 | 37 | 38 | 31 | 12 | 11 | 10 | 9 | 24 | 33 | 14 | 3 | 0 |
| 6 | 21 | 36 | 39 | 30 | 29 | 28 | 27 | 26 | 25 | 32 | 13 | 2 | 1 | 8 | 23 | 34 | 15 | 4 | 5 |
| 19 | 20 | 37 | 38 | 31 | 12 | 11 | 10 | 9 | 24 | 33 | 14 | 3 | 0 | 7 | 22 | 35 | 16 | 17 | 18 |
| 28 | 27 | 26 | 25 | 32 | 13 | 2 | 1 | 8 | 23 | 34 | 15 | 4 | 5 | 6 | 21 | 36 | 39 | 30 | 29 |
| 11 | 10 | 9 | 24 | 33 | 14 | 3 | 0 | 7 | 22 | 35 | 16 | 17 | 18 | 19 | 20 | 37 | 38 | 31 | 12 |
| 2 | 1 | 8 | 23 | 34 | 15 | 4 | 5 | 6 | 21 | 36 | 39 | 30 | 29 | 28 | 27 | 26 | 25 | 32 | 13 |
| 3 | 0 | 7 | 22 | 35 | 16 | 17 | 18 | 19 | 20 | 37 | 38 | 31 | 12 | 11 | 10 | 9 | 24 | 33 | 14 |
| 4 | 5 | 6 | 21 | 36 | 39 | 30 | 29 | 28 | 27 | 26 | 25 | 32 | 13 | 2 | 1 | 8 | 23 | 34 | 15 |
| 17 | 18 | 19 | 20 | 37 | 38 | 31 | 12 | 11 | 10 | 9 | 24 | 33 | 14 | 3 | 0 | 7 | 22 | 35 | 16 |

FIG. 2

| 30 | 29 | 28 | 27 | 26 | 25 |
|----|----|----|----|----|----|
| 31 | 12 | 11 | 10 | 9  | 24 |
| 32 | 13 | 2  | 1  | 8  | 23 |
| 33 | 14 | 3  | 0  | 7  | 22 |
| 34 | 15 | 4  | 5  | 6  | 21 |
| 35 | 16 | 17 | 18 | 19 | 20 |
| 36 | 39 |    |    |    |    |
| 37 | 38 |    |    |    |    |

|    |    |    |    |    |    |    |    |    |    |    |    |    |    |    |    |    |    |    |    |
|----|----|----|----|----|----|----|----|----|----|----|----|----|----|----|----|----|----|----|----|
| 12 | 11 | 10 | 9  | 11 | 10 | 12 | 3  | 2  | 1  | 8  | 15 | 10 | 3  | 0  | 1  | 0  | 6  | 12 | 15 |
| 13 | 6  | 5  | 4  | 2  | 9  | 13 | 4  | 3  | 0  | 7  | 14 | 11 | 4  | 5  | 6  | 4  | 5  | 13 | 14 |
| 14 | 7  | 2  | 1  | 1  | 8  | 14 | 5  | 4  | 5  | 6  | 13 | 12 | 15 | 8  | 7  | 11 | 10 | 9  | 8  |
| 15 | 8  | 3  | 0  | 0  | 7  | 15 | 6  | 9  | 10 | 11 | 12 | 13 | 14 | 9  | 2  | 3  | 2  | 1  | 7  |
| 10 | 3  | 0  | 1  | 0  | 6  | 12 | 15 | 12 | 11 | 10 | 9  | 11 | 10 | 12 | 3  | 2  | 1  | 8  | 15 |
| 11 | 4  | 5  | 6  | 4  | 5  | 13 | 14 | 13 | 6  | 5  | 4  | 2  | 9  | 13 | 4  | 3  | 0  | 7  | 14 |
| 12 | 15 | 8  | 7  | 11 | 10 | 9  | 8  | 14 | 7  | 2  | 1  | 1  | 8  | 14 | 5  | 4  | 5  | 6  | 13 |
| 13 | 14 | 9  | 2  | 3  | 2  | 1  | 7  | 15 | 8  | 3  | 0  | 0  | 7  | 15 | 6  | 9  | 10 | 11 | 12 |
| 11 | 10 | 12 | 3  | 2  | 1  | 8  | 15 | 10 | 3  | 0  | 1  | 0  | 6  | 12 | 15 | 12 | 11 | 10 | 9  |
| 2  | 9  | 13 | 4  | 3  | 0  | 7  | 14 | 11 | 4  | 5  | 6  | 4  | 5  | 13 | 14 | 13 | 6  | 5  | 4  |
| 1  | 8  | 14 | 5  | 4  | 5  | 6  | 13 | 12 | 15 | 8  | 7  | 11 | 10 | 9  | 8  | 14 | 7  | 2  | 1  |
| 0  | 7  | 15 | 6  | 9  | 10 | 11 | 12 | 13 | 14 | 9  | 2  | 3  | 2  | 1  | 7  | 15 | 8  | 3  | 0  |
| 0  | 6  | 12 | 15 | 12 | 11 | 10 | 9  | 11 | 10 | 12 | 3  | 2  | 1  | 8  | 15 | 10 | 3  | 0  | 1  |
| 4  | 5  | 13 | 14 | 13 | 6  | 5  | 4  | 2  | 9  | 13 | 4  | 3  | 0  | 7  | 14 | 11 | 4  | 5  | 6  |
| 11 | 10 | 9  | 8  | 14 | 7  | 2  | 1  | 1  | 8  | 14 | 5  | 4  | 5  | 6  | 13 | 12 | 15 | 8  | 7  |
| 3  | 2  | 1  | 7  | 15 | 8  | 3  | 0  | 0  | 7  | 15 | 6  | 9  | 10 | 11 | 12 | 13 | 14 | 9  | 2  |
| 2  | 1  | 8  | 15 | 10 | 3  | 0  | 1  | 0  | 6  | 12 | 15 | 12 | 11 | 10 | 9  | 11 | 10 | 12 | 3  |
| 3  | 0  | 7  | 14 | 11 | 4  | 5  | 6  | 4  | 5  | 13 | 14 | 13 | 6  | 5  | 4  | 2  | 9  | 13 | 4  |
| 4  | 5  | 6  | 13 | 12 | 15 | 8  | 7  | 11 | 10 | 9  | 8  | 14 | 7  | 2  | 1  | 1  | 8  | 14 | 5  |
| 9  | 10 | 11 | 12 | 13 | 14 | 9  | 2  | 3  | 2  | 1  | 7  | 15 | 8  | 3  | 0  | 0  | 7  | 15 | 6  |

| 4 | 0 | 7 | 2 | 1 |
|---|---|---|---|---|
| 2 | 1 | 4 | 0 | 7 |
| 6 | 7 | 2 | 1 | 4 |
| 16 | 9 | 0 | 7 | 2 |
| 16 | 16 | 7 | 4 | 0 |

BIT-MAP DECOMPRESSION

BACKGROUND OF THE DISCLOSURE

Raster type printers, which have been implemented with various print engines such as electrophotographic print engines and ink jet print engines, sometimes employ lossy bit-map compression and decompression so that all pages will print. Lossy compression/decompression can result in unwanted artifacts, and it can be difficult to reduce artifacts when lossy compression/decompression is employed.

BRIEF DESCRIPTION OF DRAWINGS

FIG. 2 is a schematic illustration of an embodiment of an uncompressed half-toned bit-map that is partitioned into a plurality of multi-pixel compression cells, and an embodiment of an associated half-tone threshold value array.

DETAILED DESCRIPTION OF THE DISCLOSURE

Figure 1:
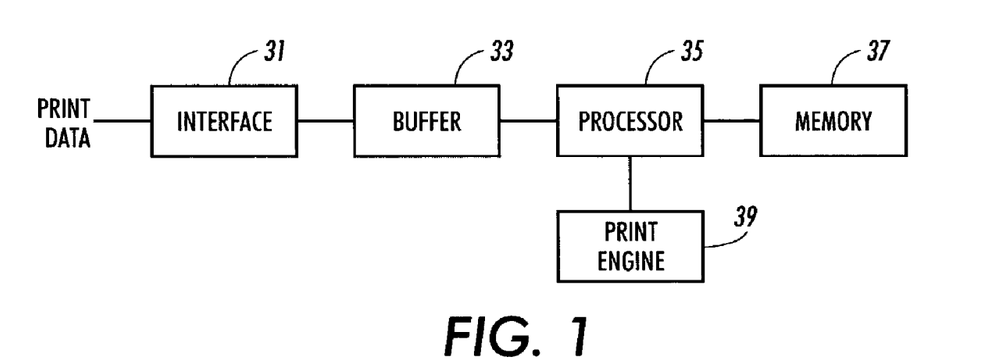
FIG. 1 is a schematic block diagram of an embodiment of a raster type printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit map raster data generated by the processor 35. The print engine 39 can be an electrophotographic print engine or an ink jet print engine, for example.

Printing is accomplished by selectively printing, depositing, applying or otherwise forming markings such as dots on a receiver surface or substrate that can be a print output medium such as paper or a transfer surface such as a transfer drum. If a transfer surface is used, the image formed or printed on the transfer surface is appropriately transferred to a print output medium such as paper. In raster type printing, the markings can be formed at locations of a grid pattern that can be called a pixel array wherein each location that is capable of receiving at least one marking is called a pixel or pixel location. The data produced by the processor that defines what marking(s), if any, are to be applied to pixel locations on a pixel by pixel basis can be called pixel data. Commonly, the pixel data can comprise a plurality of bit-maps, one bit-map for each primary color plane (e.g., cyan, magenta, yellow, black). A bit-map can be considered a bi-level pixel data array.

Figure 3:
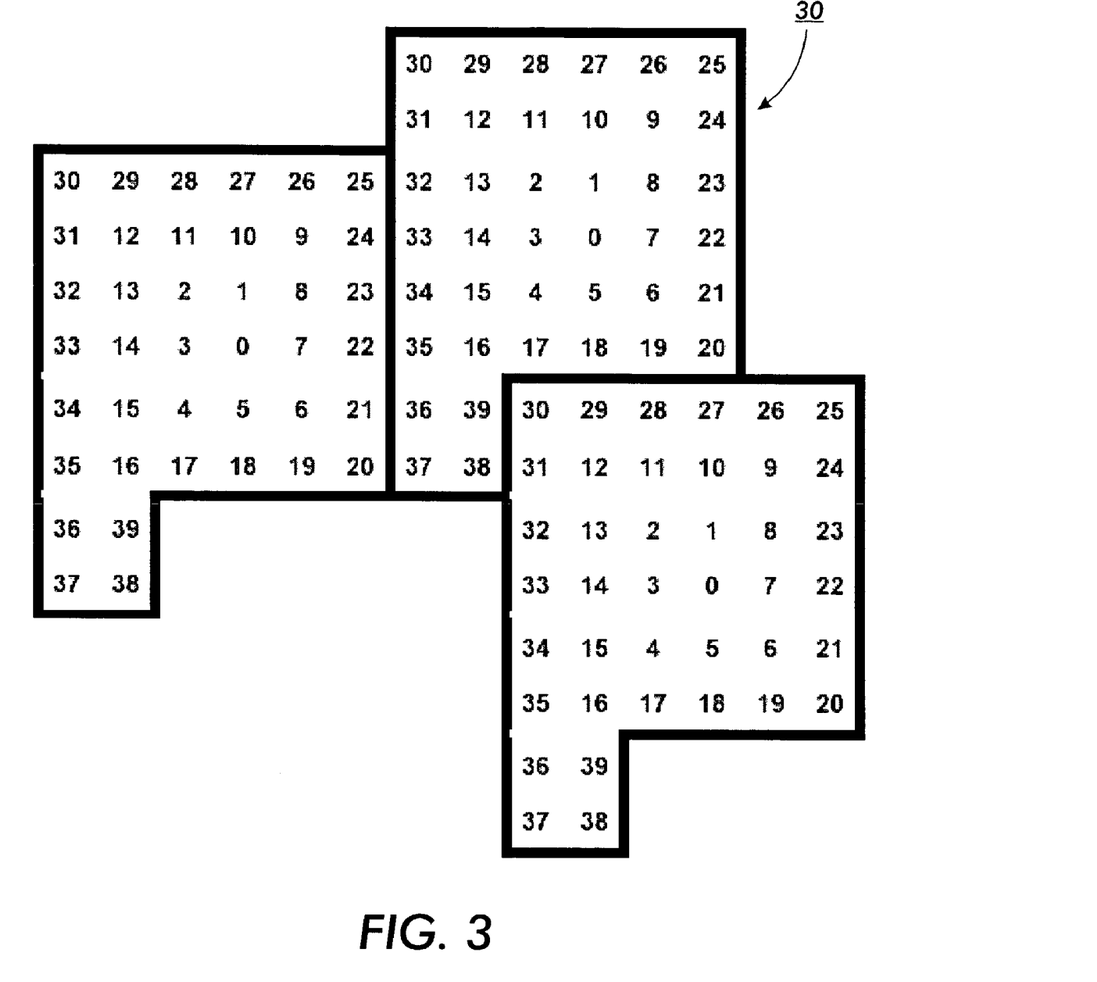
FIG. 3 is a schematic illustration of an embodiment of a half-tone cell that was employed to form the half-tone threshold value array illustrated in FIG. 2.

FIG. 2 is a schematic illustration of an embodiment of an uncompressed half-toned bit-map 20 that is organized or partitioned into multi-pixel compression cells or sub-groups C(0, 0) through C(4, 4), and an embodiment of an associated half-tone threshold value array, whereby each pixel of the bit-map has an associated half-tone threshold value. Each square of the bit-map represents a pixel data bit or pixel, for example for a given color plane. Illustrating a half-toned bit-map in a grid pattern can aid in understanding that each bit is data for a particular location in a pixel array for a particular color. The number in a square is the half-tone threshold value associated with the pixel or bit represented by that square. For ease of illustration, the half-tone threshold value array comprises a tessellation of a 41-level half-tone cell shown in FIG. 3. In actual implementations, the half-tone cells employed can be larger or smaller.

The contents of the half-toned bit-map would comprise for example the result of half-toning multi-bit pixel data (e.g., continuous tone, gray-scale, luminance, darkness, intensity or multi-level pixel data) to bit mapped raster data that contains one bit per pixel in accordance with the particular half-tone threshold values. It should be appreciated that the contents of the half-toned bit-map can be generated one band or portion at a time and then compressed for convenient storage in memory. The compressed bit-map is then decompressed to a decompressed bit-map so that it can be printed.

Figure 4:
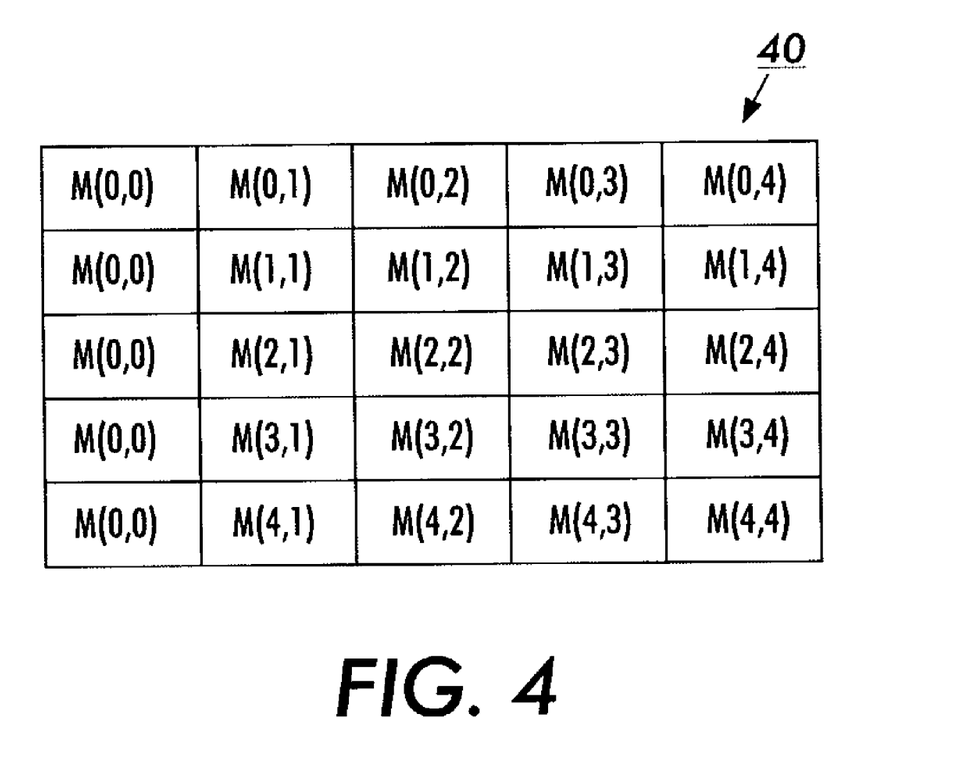
FIG. 4 is a schematic illustration of an embodiment of a compressed bit-map that is the result of a marked pixel count compression of the bit-map of FIG. 2.

FIG. 4 is a schematic illustration of an embodiment of a compressed bit-map that is based on marked pixel count compression of the half-toned bit-map of FIG. 2, and includes an array of marked pixel counts M(0, 0) through M(4, 4), wherein each pixel count is set to the number of pixels that are on in the corresponding compression cell of the half-toned bit-map of FIG. 2. In use, each marked pixel count is employed to populate a decompressed cell of a decompressed bit-map.

Figure 5:
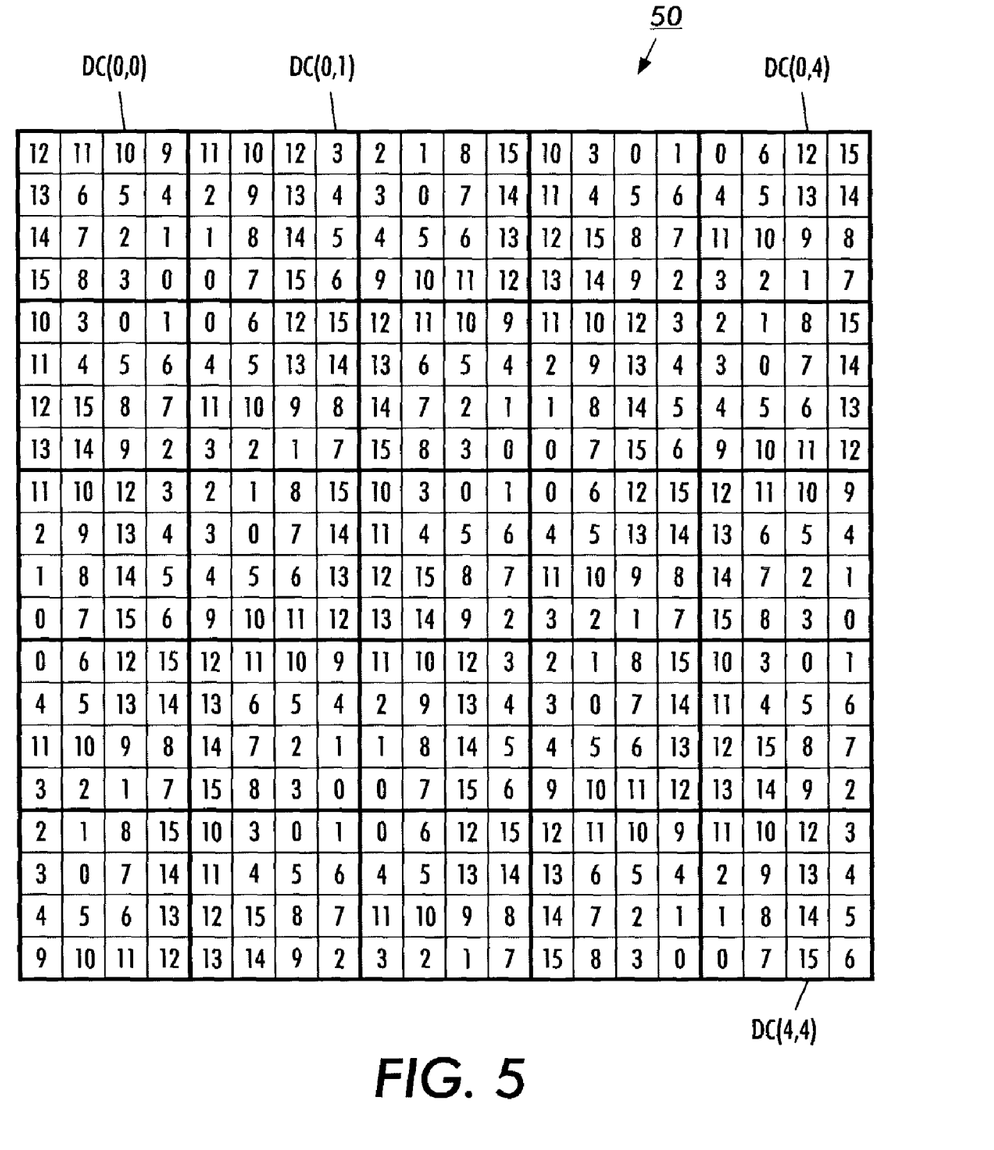
FIG. 5 is a schematic illustration of an embodiment of a decompressed bit-map that is partitioned into a plurality of multi-pixel decompressed cells, and an embodiment of fill order value arrays respectively associated with the decompressed cells.

FIG. 5 is a schematic illustration of an embodiment of a decompressed bit-map that is organized or partitioned into a plurality of decompressed cells or sub-groups DC(0, 0) through DC(4, 4) that are respectively associated with respective compression cells C(0, 0) through C(4, 4) of the source or original bit-map depicted in FIG. 2. The decompressed cells can be substantially identical in size (i.e., number of pixels), shape (i.e., number of rows and number of columns), and location (i.e., position in a bit-map) to respectively associated compression cells C0-CN in the original uncompressed bit-map depicted in FIG. 2. FIG. 5 further illustrates for each decompressed cell an embodiment of an associated decompression cell fill order value pattern that is based on the half-tone threshold values for corresponding pixels of a corresponding compression cell in FIG. 2.

For example, each pixel of a decompressed cell more particularly has an associated fill-order value or sequence number that corresponds to the relative order of the corresponding threshold value in the corresponding compression cell, such that each pixel of a decompressed cell has an associated fill-order value between 0 and N−1, wherein N is number of pixels in each of the compression and decompressed cells. In other words, the fill order values associated with a decompressed cell correspond to the relative ordering of the threshold values in the corresponding compression cell. For the particular example of a 4 pixel by 4 pixel cell, N is 16.

Figure 6:
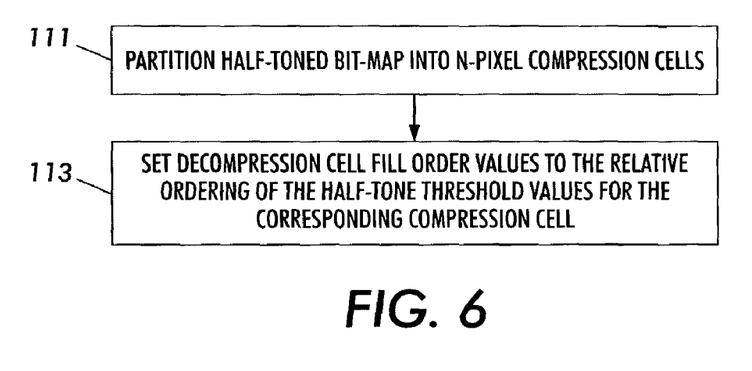
FIG. 6 is a schematic flow diagram of an embodiment of a procedure for determining fill order values for an array of decompressed cells.

FIG. 6 is a schematic flow diagram of a procedure for defining the decompression fill order values for the pixels of the decompressed cells.

At 111 a half-toned bit-map is partitioned into a plurality of N-pixel compression cells, wherein N is greater than 1.

At 11 the fill order values for each decompressed cell are set to the relative ordering of the half-tone threshold values for the corresponding compression cell, such that the fill order values are between 0 and N−1.

Figure 7:
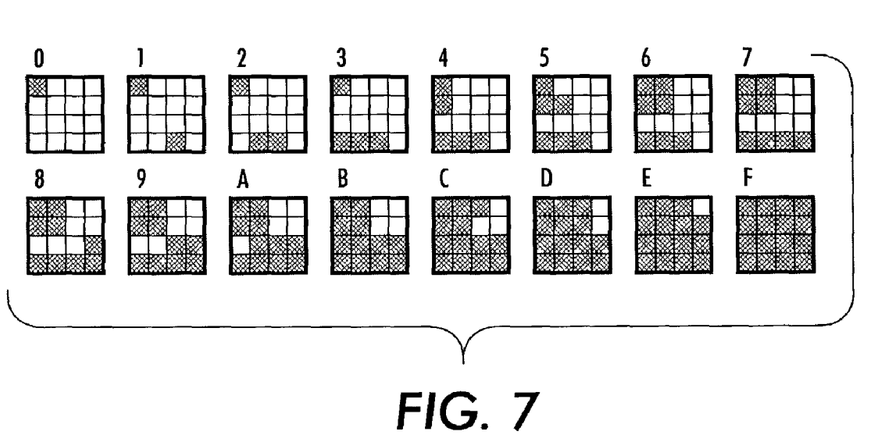
FIG. 7 is a schematic illustration of embodiments of decompressed patterns for the different marked bit counts that would be employed for the upper right hand decompressed cell of the decompressed bit-map of FIG. 5.

In this manner, each decompressed cell has an associated fill order pattern that is based solely on the half-tone threshold values for the corresponding compression cell, and a set of decompressed bit patterns, one for each possible marked pixel count, can be computed for each decompressed cell. FIG. 7 is a schematic illustration of embodiments of decompression patterns for the different marked bit counts that would be employed for the upper right hand decompressed cell DC(0, 4) of the decompressed bit-map of FIG. 5. The decompressed bit map would be written or populated in accordance with the respective decompression patterns as selected or pointed to by the marked pixel counts. In other words, the fill order pattern for a decompressed cell is defined by the relative ordering of the half-tone threshold values of the pixels of the corresponding compression cell.

Figure 8:
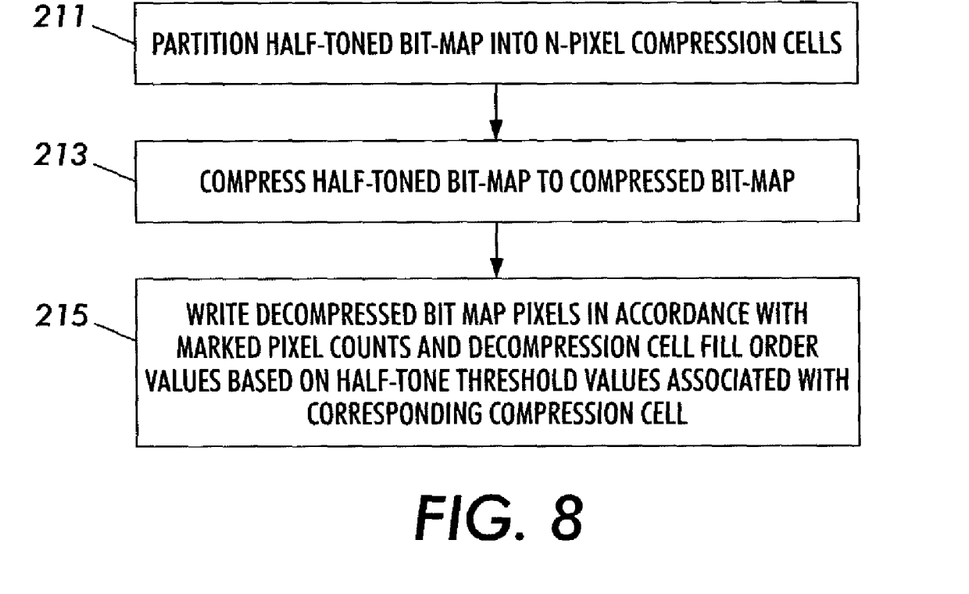
FIG. 8 is a schematic flow diagram of an embodiment of a procedure for compressing a bit-map to a compressed bit-map and decompressing the compressed bit-map to a decompressed bit-map.

FIG. 8 is a schematic flow diagram of a procedure for compressing and decompressing an uncompressed half-toned bit-map that is based on a predetermined half-tone threshold value array.

At 211 a half-toned bit-map is partitioned into a plurality of N-pixel compression cells.

At 213 a marked pixel count is determined for each compression cell to produce a compressed bit-map that comprises an array of marked pixel counts. More generally, a count of the number of pixels in a predetermined state (e.g., on or off) can be employed.

At 215 the pixels of a decompressed bit-map are written based on the marked pixel counts and decompression cell fill order values that are based on the half-tone threshold values associated with the corresponding compression cells.

Figure 9:
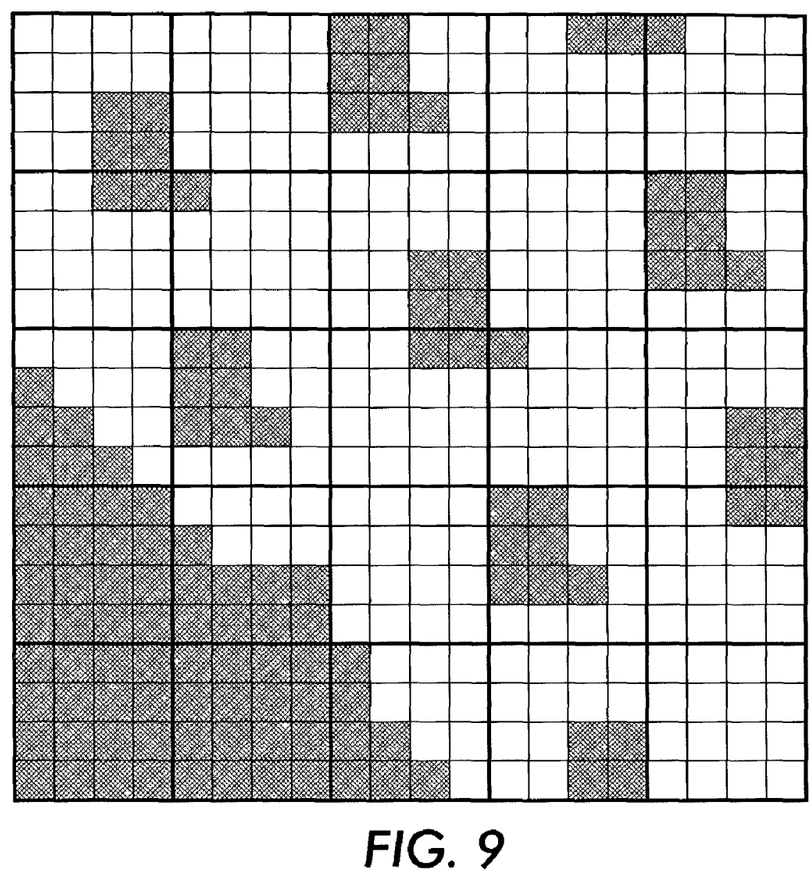
FIG. 9 is a schematic illustration of an embodiment of a bit-map that includes pixel data or bit values.
Figure 10:
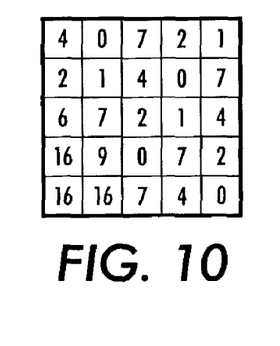
FIG. 10 is a schematic illustration of an embodiment of a compressed bit-map that can result from compression of the bit-map of FIG. 8.
Figure 11:
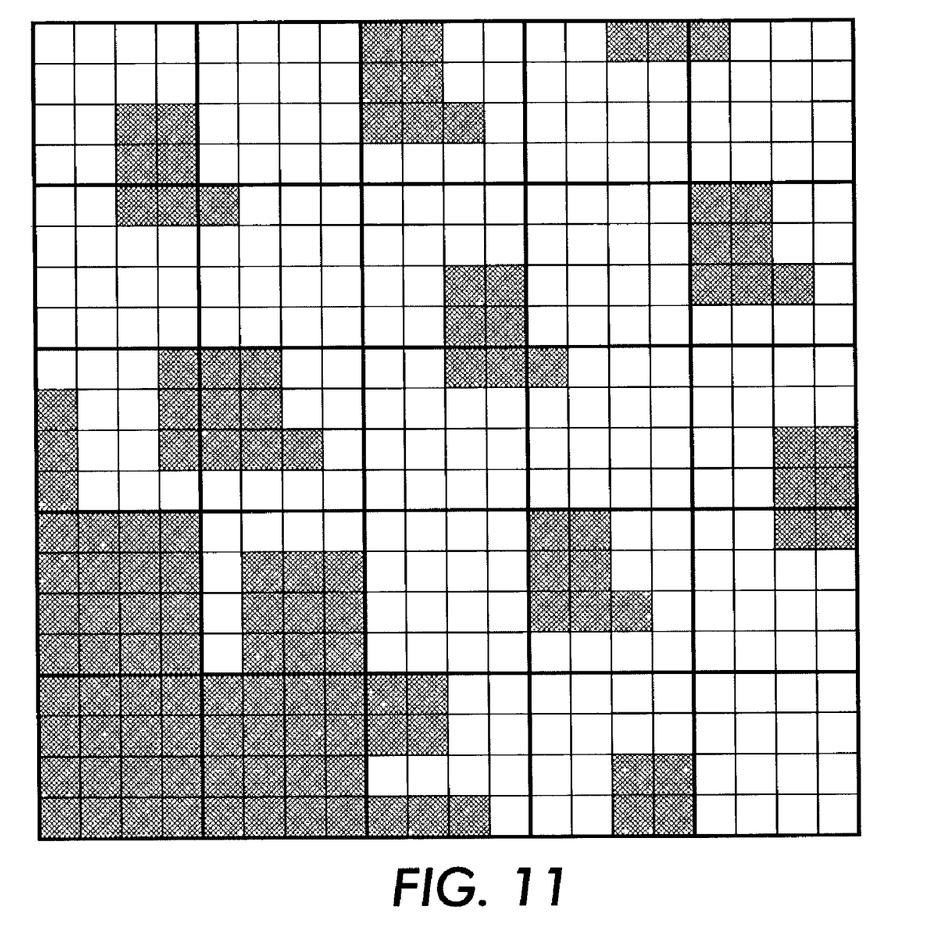
FIG. 11 is a schematic illustration of an embodiment of a decompressed bit-map that can result from de-compression of the compressed bit-map of FIG. 9.

FIG. 9 is an embodiment of an uncompressed half-toned bit-map that contains pixel values in the form of shaded (pixel on) and non-shaded (pixel off) squares, and which can be marked pixel count compressed to form a compressed bit-map of FIG. 10. The compressed bit-map of FIG. 10 can be decompressed in accordance with the foregoing to arrive at a decompressed bit-map shown in FIG. 11.

The invention has been described with reference to disclosed embodiments, and it will be appreciated that variations and modifications can be affected within the spirit and scope of the invention.

What is claimed is:

1. A method of processing a half-toned bit-map that was produced using a half-tone cell having more than N pixels, comprising:

partitioning the half-toned bit-map into a plurality of N-pixel compression cells;

storing for each compression cell a respective pixel count of pixels that are in a predetermined state in each compression cell;

respectively associating a plurality of N-pixel decompressed cells of a decompressed bit map with the plurality of N-pixel compression cells, each decompressed cell having an associated fill order pattern of fill order values that are based on half-tone threshold values for corresponding pixels of the associated compression cell, wherein the decompression fill order values are between 0 and N−1; and writing pixels of the decompressed bit-map in accordance with the pixel counts and the decompression cell fill order patterns.

2. The method of claim 1 wherein respectively associating comprises respectively associating the plurality of compression cells with a plurality of N-bit decompressed cells of a decompressed bit map, each decompressed cell having an associated fill order pattern of fill order values that comprise a sequence that corresponds to a relative ordering of half-tone threshold values for corresponding pixels of the associated compression cell, wherein the decompression fill order values are between 0 and N−1.

3. A method for decompressing a compressed bit map containing a plurality of pixel counts respectively associated with a plurality of N-pixel compression cells of an uncompressed half-toned bit-map that was produced using a half-tone cell having more than N pixels, comprising:

respectively associating a plurality of N-pixel decompressed cells of a decompressed bit-map with the plurality of N-pixel compression cells, each decompressed cell having a decompression fill order pattern of fill order values that are based on half-tone threshold values of the corresponding pixels of the associated compression cell; and writing data in the decompressed bit-map in accordance with the pixel counts and the decompression cell fill order pattern.

4. The method of claim 3 wherein the decompression fill order pattern comprises a sequence that corresponds to the relative order of the half-tone threshold values of the corresponding pixels of the associated compression cell.

5. A printing apparatus comprising:

a memory for storing a compressed half-toned bit-map;

a processor for decompressing the compressed half-toned bit-map into a decompressed bit-map that includes a plurality of N-pixel decompressed cells, wherein each decompressed cell has an associated fill-order pattern that is based on half-tone threshold values for a corresponding N-pixel compression cell of an uncompressed half-toned bit-map on which the compressed half-toned bit map is based, wherein the half-toned bit-map was produced using a half-tone cell having more than N pixels.

6. The printing apparatus of claim 5 wherein the fill order pattern comprises a sequence that corresponds to the relative ordering of the half-tone threshold values of the uncompressed half-toned bit-map.

* * * * *